Patented Apr. 7, 1953

2,634,284

UNITED STATES PATENT OFFICE 2,634,284

POLYMERIZATION OF ORGANOSILOXANES

James F. Hyde, Midland, Mich., assignor to Dow Corning Corporation, Midland, Mich., a corporation of Michigan No Drawing. Application December 29, 1951, Serial No. 264,280

11 Claims. (Cl. 260—448.2)

This application concerns methods of polymerizing organosiloxanes.

The polymerization of diorganosiloxanes with alkali is known and has been employed commercially in the preparation of organosiloxane polymers. Heretofore the polymerization has been carried out primarily in the absence of solvents or in the presence of relatively small amounts of such solvents as alcohol or toluene. Such processes usually produce polymeric siloxanes having intrinsic viscosities of one or less. The intrinsic viscosities disclosed herein were determined by the method described by Arthur J. Barry, Jour. of Applied Physics, vol. 17, No. 12, pp. 1020–1024 (Dec. 1946).

With solvents heretofore employed the amounts of solvent had to be kept low (that is, below 5 per cent) in order to prevent the formation of an excessive amount of low molecular weight cyclic materials. Furthermore, those solvents, such as alcohols, which tended to promote polymerization also introduced alkoxy groups into the siloxane under the conditions of alkaline polymerization. Thus the use of solvents in general had not proved of any advantage.

It has now been found that by employing certain nitriles and substituted amides as solvents in the polymerization of organosiloxanes with alkali that many advantageous results are obtained. It is the object of this invention to provide a more rapid method for polymerizing siloxanes, particularly the completely condensed diorganosiloxanes; to provide a superior method for producing organosiloxane polymers having very high degrees of polymerization; and to provide a method of producing high polymeric materials from diphenylsiloxane. Other advantages will be apparent from the following description.

In accordance with this invention, an organosiloxane having 1.99 to 2.1 alkyl, monocyclicaryl, halogenated phenyl or siliconeopentyl radicals per silicon atom is polymerized by contacting the siloxane with an alkaline material having a pH of at least 12 when measured in an aqueous system at a concentration not greater than 0.1 N, in the presence of a solvent of the group alkyl nitriles having from 2 to 5 carbon atoms, monocyclicaryl nitriles having from 7 to 10 carbon atoms and amides of the formula RCONR'$_2$ where R is of the group hydrogen atoms and methyl radicals and R' is an alkyl radical of less than 4 carbon atoms. The solvent is employed in amount of at least 1 per cent by weight based upon the weight of the siloxane.

In carrying out the process of this invention, the siloxane is mixed with the solvent and catalyst. Polymerization takes place even at room temperature but in order to obtain more favorable rates, it is preferred that the material be heated at a temperature of from 75° to 150° C. Higher temperatures may be employed if desired. In those cases in which the temperature is above the boiling point of the solvent, it is desirable to keep the system under autogenous pressure. Under the above conditions polymerization takes place rapidly. After the polymerization has been completed, the system may be subjected to vacuum to remove the solvent and all the volatile materials.

The amount of the solvent employed in the process of this invention should be at least 1 per cent by weight of the siloxane if it is to have any appreciable effect on the rate and extent of the polymerization. The upper limit of the amount of solvent is not critical. In those cases where there is limited compatibility between the solvent and siloxane, two phases will be formed, but this is not deleterious to the process of polymerization.

The alkaline materials operative in this invention include any alkaline substance having a pH of at least 12 when measured in an aqueous system at a concentration not greater than 0.1 N. Such substances include, for example, alkali metal hydroxides such as sodium hydroxide, lithium hydroxide, potassium hydroxide; alkali salts of organosiloxanes such as alkali metal salts of triorganosilanols, alkali metal salts of diorganosilanols, and alkali metal salts of monoorganosilanols; alkali metal silicates, trisodium phosphate, calcium hydroxide, tripotassium phosphate and quaternary ammonium hydroxides.

The preferred amount of alkali for the purposes of this invention is from 1 molecule of alkali per 25 silicon atoms to 1 molecule of alkali per 30,000 silicon atoms.

Whereas any siloxane may be polymerized by the method of this invention, the particular advantages of the present method are greatest with organosiloxanes wherein the degree of substitution is from 1.99 to 2.1 preferably 2, organic radicals per silicon. The present invention is particularly adaptable for preparing extremely high polymeric diorganosiloxane for use in siloxane elastomers. Thus, the siloxanes which are preferred in this invention are those of the type R$_2$SiO. The siloxane may also contain limited amounts of RSiO$_{3/2}$ and R$_3$SiO. The amount of the latter two types of siloxane units should be such that the ratio of organic radicals to silicon atoms in the siloxane is from 1.99 to 2.1.

The organic radicals of the silicon may be any alkyl radical such as methyl, ethyl, propyl, butyl, octadecyl or any monocyclicaryl radical such as phenyl, tolyl, xylyl or any halogenated phenyl radical or they may be siliconeopentyl radicals $[(CH_3)_3SiCH_2-]$. Thus, examples of particular siloxanes which are applicable herein are dimethylsiloxane, ethylmethylsiloxane, dibutylsiloxane, octadecylmethylsiloxane, phenylmethylsiloxane, diphenylsiloxane, neopentylmethylsiloxane, phenylneopentylsiloxane, chlorophenylmethylsiloxane and bromophenylmethylsiloxane.

The siloxanes which are to be polymerized may be homo-polymers or they may be copolymers containing two or more different siloxane units. The preferred starting materials are low molecular weight siloxanes such as octamethylcyclotetrasiloxane, or the cyclictetramer of phenylmethylsiloxane. However, it is not essential that the starting materials be cyclic. Instead they may be linear materials which are end-blocked with either triorganosilyl units or with hydroxyl groups. If desired the starting siloxane may also be a mixture of two or more different siloxanes. The product will be a copolymer of all of them. For example, if the starting material is a mixture of hexamethyltrisiloxane and hexaphenyltrisiloxane the product is a copolymer containing both dimethylsiloxane units and diphenylsiloxane units.

Diorganosiloxane polymers obtained by the method of this invention are benzene soluble and may have intrinsic viscosities as determined by the Barry method, supra, of the order of from 2.9 to 4.. This represents a degree of polymerization of over 40,000 siloxane units per molecule. The utility of such high polymers is especially great in the preparation of organopolysiloxane rubbers.

The following examples are illustrative only and are not to be considered as limiting the invention. The invention is properly delineated in the appended claims.

*Example 1*

The catalyst used in this example was the sodium salt of tetramethyldisiloxane diol $[NaOSi(CH_3)_2OSi(CH_3)_2ONa]$ This salt was prepared as described in the U. S. Patent No. 2,567,110.

148 grams of octamethylcyclotetrasiloxane, .04 gram of the above sodium salt and 148 grams of acetonitrile were mixed, placed in a closed container and heated at 75° to 100° C. for three days. At the end of this time, the viscosity of the solution was $44 \times 10^6$ cs. The solvent was then removed by heating in a vacuum at 140° C. to remove the solvent and other volatile material. The resulting polymer had an intrinsic viscosity of 2.3. This represents a degree of polymerization of about 19,000 dimethylsiloxane units per molecule. This material was completely soluble in benzene.

*Example 2*

148 grams of octamethylcyclotetrasiloxane, .049 of the dimethylsiloxane sodium salt of Example 1 and 20 ccs. of acetonitrile were mixed and heated in a closed container at 100° C. When the solution viscosity had become constant, the solvent was removed under vacuum which gave a soft crumbly material which was completely soluble in benzene. The intrinsic viscosity of this polymer was 3.9 which represents a degree of polymerization of 42,700 dimethylsiloxane units per molecule.

*Example 3*

148 grams of octamethylcyclotetrasiloxane was mixed with 0.1 gram of the salt of Example 1 and with 5 grams of dimethylformamide. The mixture was heated at 75° C. After 24 hours the solution viscosity became constant at 45,900 cs. The solution was washed neutral and the solvent was removed under vacuum. The resulting polymer had an intrinsic viscosity of 1.98 which represents a degree of polymerization of 16,000 dimethylsiloxane units per molecule.

*Example 4*

148 grams of octamethylcyclotetrasiloxane, .049 grams of  and 20 ccs. of acetonitrile were mixed and heated 9 hours at 75° C. in a closed vessel. The resulting polymer had a viscosity of $17.97 \times 10^6$ cs.

*Example 5*

Employing the general procedure of Example 1, high polymers have been obtained using the following solvents: benzonitrile, valeronitrile, dimethylacetamide, and diethylacetamide.

*Example 6*

Using the general procedure of Example 1, the following catalysts have been employed to obtain high polymers from octamethylcyclotetrasiloxane: sodium hydroxide, potassium hydroxide, $CH_3SiOONa$, $K_2SiO_3$, $K_3PO_4$, tetramethylammonium hydroxide, $NaOSi(C_6H_5)_2ONa$ and $NaO[C_6H_5(CH_3)SiO]_2Na$.

*Example 7*

Employing the general procedure of Example 1 high polymers have been obtained by employing the following siloxanes: hexaethylcyclotrisiloxane, trimethyltriethylcyclotrisiloxane, hexaphenylcyclotrisiloxane, tetramethyltetraphenyltetrasiloxane, a mixture of 5 mol per cent tetramethyltetraphenylcyclotetrasiloxane and 95 mol per cent octamethylcyclotetrasiloxane and a mixture of 35 mol per cent octaphenyltetrasiloxane and 65 mol per cent octamethyltetrasiloxane.

*Example 8*

High polymeric siloxanes are obtained when 100 grams of a mixture of 85 mol per cent dimethylsiloxane and 15 mol per cent siliconeopentylmethylsiloxane, .01 gram of KOH and 10 ccs. of acetonitrile are mixed and heated 1 day at 100° C.

*Example 9*

Copolymers having high degrees of polymerization are obtained when 150 grams of a mixture of 75 mol per cent of a dimethylsiloxane fluid containing 3.5 per cent by weight silicon bonded OH radicals and 25 mol per cent of a chlorophenylmethylsiloxane fluid containing 3 per cent by weight silicon bonded hydroxyls, .04 gram of KOH and 100 grams of acetonitrile are heated at 75° C. for 24 hours.

That which is claimed is:

1. The method of polymerizing an organosiloxane which comprises contacting an organosiloxane having from 1.99 to 2.1 hydrocarbon radicals per silicon atom, said radicals being selected from the group consisting of alkyl, monocyclicaryl, halogenated phenyl and siliconeopentyl radicals, with an alkaline material having a pH of at least 12 when measured in an aqueous solution at a concentration not greater than 0.1 N, said alkaline material being present in amount of from 1 molecule of alkali per 25 silicon atoms to 1 molecule of alkali per 30,000 silicon atoms, in the presence of at least 1 per cent by weight based upon the weight of the siloxane of a solvent selected from the group consisting of alkyl nitriles having from 2 to 5 carbon atoms per molecule, monocyclicaryl nitriles having from 7 to 10 carbon atoms per molecule and amides of the formula $RCONR'_2$ where R is selected from the group consisting of hydrogen atoms and methyl radicals and R' is an alkyl radical of less than 4 carbon atoms, until an increase in the degree of polymerization of the organosiloxane is obtained.

2. The method in accordance with claim 1 in which the organosiloxane is a dimethylsiloxane.

3. The method in accordance with claim 1 in which the organosiloxane is a mixture of dimethylsiloxane and phenylmethylsiloxane.

4. The method in accordance with claim 1 in which the organosiloxane is a mixture of dimethylsiloxane and diphenylsiloxane.

5. The method in accordance with claim 1 in which the siloxane is phenylmethylsiloxane.

6. The method in accordance with claim 1 in which the siloxane is diphenylsiloxane.

7. A method of polymerizing dimethylsiloxane which comprises contacting it with an alkaline material selected from the group consisting of alkali metal hydroxides and alkali metal salts of diorganosilanols in which the organic radicals are selected from the group consisting of phenyl and methyl radicals, said alkaline material being employed in amount of from 1 molecule of alkali per 25 silicon atoms to 1 molecule of alkali per 30,000 silicon atoms, in the presence of at least 1 per cent by weight acetonitrile based on the weight of the dimethylsiloxane until an increase in the degree of polymerization of said siloxane is obtained.

8. The method of polymerizing phenylmethylsiloxane which comprises contacting it with an alkaline material selected from the group consisting of alkali metal hydroxides and alkali metal salts of diorganosilanols in which the organic radicals are selected from the group consisting of phenyl and methyl radicals, said alkaline materials being employed in amount of from 1 molecule of alkali per 25 silicon atoms to 1 molecule of alkali per 30,000 silicon atoms, in the presence of at least 1 per cent by weight acetonitrile based on the weight of the phenylmethylsiloxane until an increase in the degree of polymerization of said siloxane is obtained.

9. The method of polymerizing diphenylsiloxane which comprises contacting it with an alkaline material selected from the group consisting of alkali metal hydroxides and alkali metal salts of diorganosilanols in which the organic radicals are selected from the group consisting of phenyl and methyl radicals, said alkaline materials being employed in amount of from 1 molecule of alkali per 25 silicon atoms to 1 molecule of alkali per 30,000 silicon atoms, in the presence of at least 1 per cent by weight acetonitrile based on the weight of the diphenylsiloxane until an increase in the degree of polymerization of said siloxane is obtained.

10. The method of copolymerizing a mixture of dimethylsiloxane and phenylmethylsiloxane which comprises contacting the mixture with an alkaline material selected from the group consisting of alkali metal hydroxides and alkali metal salts of diorganosilanols, in which the organic radicals are selected from the group consisting of phenyl and methyl radicals, said alkaline material being employed in amount of from 1 molecule of alkali per 25 silicon atoms to 1 molecule of alkali per 30,000 silicon atoms, in the presence of at least 1 per cent by weight acetonitrile based on the weight of the mixed siloxanes until an increase in the degree of polymerization of the mixture is obtained.

11. The method of copolymerizing a mixture of diphenylsiloxane and dimethylsiloxane which comprises contacting the mixture with an alkaline material selected from the group consisting of alkali metal hydroxides and alkali metal salts of diorganosilanols, in which the organic radicals are selected from the group consisting of phenyl and methyl radicals, said alkaline material being employed in amount of from 1 molecule of alkali per 25 silicon atoms to 1 molecule of alkali per 30,000 silicon atoms in the presence of at least 1 per cent by weight acetonitrile based on the weight of the mixed siloxanes until an increase in the degree of polymerization of the mixture is obtained.

JAMES F. HYDE.

No references cited.